United States Patent
An et al.

(10) Patent No.: US 10,573,462 B2
(45) Date of Patent: Feb. 25, 2020

(54) CAPACITOR COMPONENT

(71) Applicant: SAMSUNG ELECTRO-MECHANICS CO., LTD., Suwon-Si, Gyeonggi-Do (KR)

(72) Inventors: Sung Kwon An, Suwon-Si (KR); Jin Kyung Joo, Suwon-Si (KR); Hyo Youn Lee, Suwon-Si (KR); Seung Woo Song, Suwon-Si (KR); Taek Jung Lee, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/009,784

(22) Filed: Jun. 15, 2018

(65) Prior Publication Data

US 2019/0066928 A1 Feb. 28, 2019

(30) Foreign Application Priority Data

Aug. 31, 2017 (KR) .................. 10-2017-0110691

(51) Int. Cl.
| | |
|---|---|
| *H01G 4/30* | (2006.01) |
| *H01G 4/12* | (2006.01) |
| *H01G 4/012* | (2006.01) |
| *H01G 4/228* | (2006.01) |

(52) U.S. Cl.
CPC ............. *H01G 4/30* (2013.01); *H01G 4/012* (2013.01); *H01G 4/12* (2013.01); *H01G 4/228* (2013.01)

(58) Field of Classification Search
CPC .......... H01G 4/005; H01G 4/006; H01G 4/08; H01G 4/012; H01G 4/12; H01G 4/30; H01G 4/232; H01G 4/228; H01G 4/252
See application file for complete search history.

(56) References Cited

U.S. PATENT DOCUMENTS

2004/0207043 A1* 10/2004 Matsunaga ......... H01L 23/5223
257/534
2006/0198079 A1 9/2006 Shim et al.
(Continued)

FOREIGN PATENT DOCUMENTS

| CN | 1484310 A | 3/2004 |
|---|---|---|
| CN | 1832070 A | 9/2006 |

(Continued)

OTHER PUBLICATIONS

Office Action issued in corresponding Chinese Patent Application No. 201811008929.3 dated Jan. 3, 2020, with English translation.

*Primary Examiner* — Nguyen T Ha
(74) *Attorney, Agent, or Firm* — Morgan, Lewis & Bockius LLP

(57) ABSTRACT

A capacitor component includes a multilayer structure including unit laminates. Each unit laminate has a plurality of internal electrodes and a first connecting electrode extending in a stacking direction of the plurality of internal electrodes and connected to portions of the plurality of internal electrodes. First connecting electrodes of unit laminates adjacent to each other among the unit laminates are connected to each other. A diameter of a first connecting electrode of at least one of the unit laminates is different from diameters of first connecting electrodes of other unit laminates.

20 Claims, 9 Drawing Sheets

(56) References Cited

U.S. PATENT DOCUMENTS

| | | | |
|---|---|---|---|
| 2007/0064374 A1* | 3/2007 | Togashi | H01G 4/232 361/307 |
| 2008/0029764 A1* | 2/2008 | Adachi | G02F 1/136213 257/59 |
| 2010/0020465 A1* | 1/2010 | Fukudome | H01G 4/12 361/301.4 |
| 2012/0300360 A1* | 11/2012 | Take | H01G 4/30 361/301.4 |
| 2013/0038981 A1* | 2/2013 | Imanaka | H01G 4/1227 361/301.4 |
| 2013/0258545 A1* | 10/2013 | Yano | H01G 4/306 361/301.4 |
| 2015/0043126 A1* | 2/2015 | Hurwitz | H01L 28/65 361/303 |
| 2015/0124371 A1 | 5/2015 | Park et al. | |
| 2015/0263754 A1* | 9/2015 | Srinivas | H01G 4/228 341/161 |

FOREIGN PATENT DOCUMENTS

| | | |
|---|---|---|
| CN | 104637680 A | 5/2015 |
| JP | 2001-313230 A | 11/2001 |
| JP | 2004-342671 A | 12/2004 |
| JP | 4748317 B2 | 8/2011 |
| JP | 2013-042083 A | 2/2013 |
| JP | 2015-070058 A | 4/2015 |

\* cited by examiner

CAPACITOR COMPONENT

CROSS-REFERENCE TO RELATED APPLICATION(S)

This application claims benefit of priority to Korean Patent Application No. 10-2017-0110691 filed on Aug. 31, 2017 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC), which is one of the capacitor components, is a chip type capacitor which is mounted on a printed circuit board of various electronic products of image devices such as a liquid crystal display (LCD) and a plasma display panel (PDP), a computer, a smartphone, a mobile phone, and the like, to serve to charge or discharge electricity. The multilayer ceramic capacitor (MLCC) may be used as a component of various electronic devices due to advantages of miniaturization, high capacity, and ease of mounting.

The MLCC may be used as a component of various electronic devices due to advantages of miniaturization, high capacity, and ease of mounting, and recently, is under development focusing on high capacity and high reliability. To realize the high capacity capacitor, there may be a method of increasing a dielectric constant of a material forming a capacitor body or reducing a thickness of a dielectric layer and an internal electrode to increase the number of stacked layers. However, since it is not easy to develop a composition of a high-k material and the methods currently in use have limitations in reducing the thickness of the dielectric layer, these methods have limitations in increasing the capacity of products.

In addition, the multilayer ceramic capacitor in which vias or through holes are formed and filled with a conductive material to form via electrodes connected to internal electrodes, and lower electrodes are formed to be connected to the via electrodes is under development.

SUMMARY

An aspect of the present disclosure may provide a capacitor component which may be implemented in high capacity and may obtain excellent electrical connectivity and reliability by reducing misalignment between connecting electrodes even when a thickness is increased.

According to an aspect of the present disclosure, a capacitor component may include a multilayer structure including unit laminates. Each unit laminate may include a plurality of internal electrodes and a first connecting electrode extending in a stacking direction of the plurality of internal electrodes and connected to portions of the plurality of internal electrodes. First connecting electrodes of unit laminates adjacent to each other among the unit laminates may be connected to each other. A diameter of a first connecting electrode of at least one of the unit laminates may be different from diameters of first connecting electrodes of other unit laminates.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
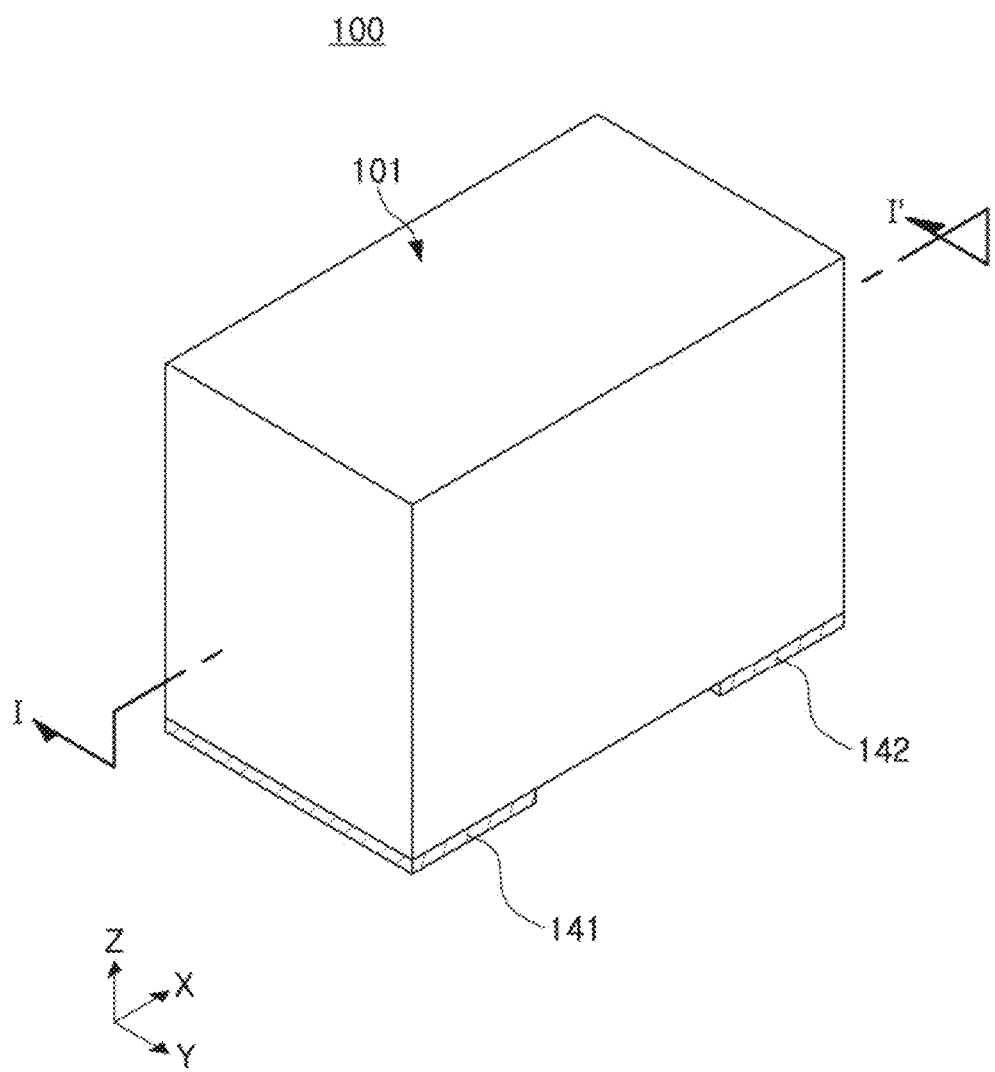
FIG. 1 is a perspective view schematically showing a capacitor component according to an exemplary embodiment in the present disclosure.
Figure 2:
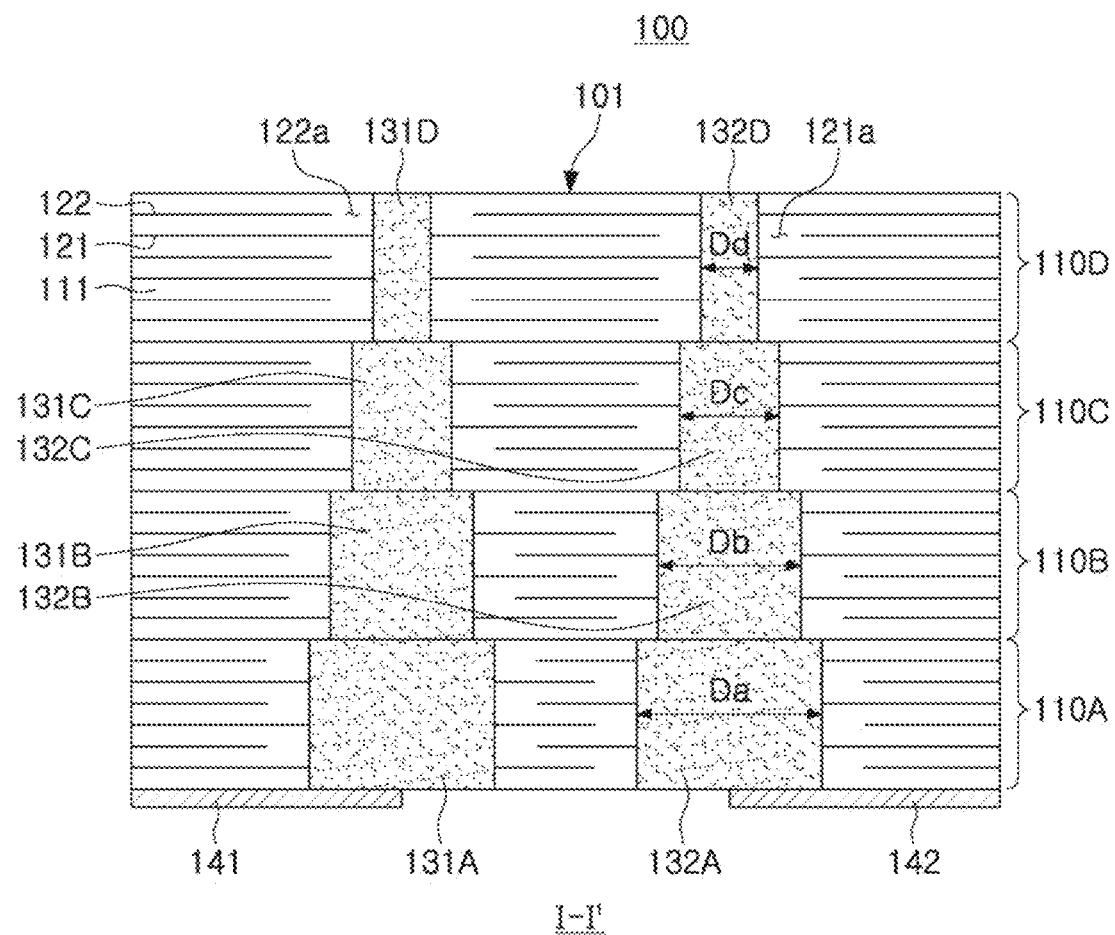
FIG. 2 is a cross-sectional view schematically illustrating the capacitor component taken along I-I' of FIG. 1.
Figure 3:
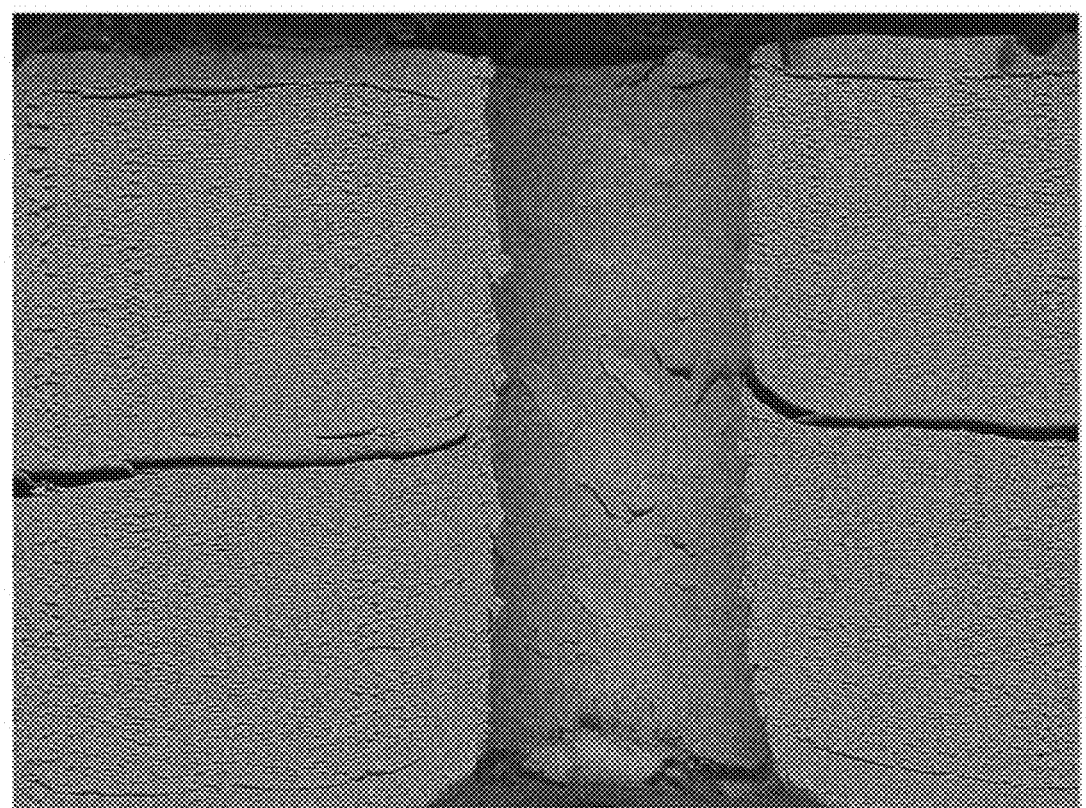
FIG. 3 is a photograph of cracks and delamination occurring according to a formation of vias.
Figure 4:
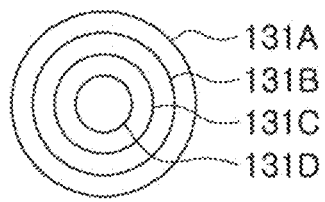
FIGS. 4 and 5 show possible connection forms of connecting electrodes.
Figure 5:
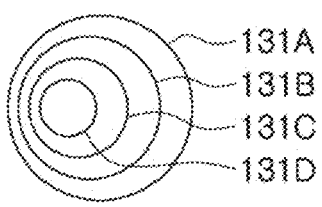

FIG. 1 is a perspective view schematically showing a capacitor component according to an exemplary embodiment in the present disclosure. FIG. 2 is a cross-sectional view schematically illustrating the capacitor component taken along I-I' of FIG. 1. FIG. 3 is a photograph of cracks and delamination occurring according to a formation of vias. FIGS. 4 and 5 show possible connection forms of connecting electrodes.

First, referring to FIGS. 1 and 2, a capacitor component according to an exemplary embodiment in the present disclosure has a multilayer structure 101 in which a plurality of unit laminates 110A, 110B, 110C, and 110D are stacked. Here, connecting electrodes of unit laminates adjacent to each other among the plurality of unit laminates 110A, 110B, 110C, and 110D are connected to each other, and a diameter Da, Db, Dc, or Dd of the connecting electrode of at least one of the plurality of unit laminates 110A, 110B, 110C, and 110D is different from those of the connecting electrodes of other unit laminates.

First and second external electrodes 141 and 142 may be disposed at a lower part of the capacitor component 100. Specifically, the first and second external electrodes 141 and 142 may be formed on a lower surface of the unit laminate 110A disposed at a lowermost part among the unit laminates 110A, 110B, 110C, and 110D.

In this exemplary embodiment, to prevent damages around vias, delamination, cracks or the like from occurring during the formation of the vias while effectively increasing capacity of the capacitor component 100, the unit laminates 110A, 110B, 110C, and 110D may be formed and then stacked.

When a thickness of the body is thin, the damages around the vias, the delamination, the cracks or the like are less likely to occur during the formation of the vias. However, when to obtain the high capacity, a plurality of dielectric layers and internal electrodes are stacked at a time to increase the thickness of the body and then the vias are formed, the damages around the vias, the delamination, the cracks or the like are likely to occur.

To form the vias, a laser drill, a mechanical pin puncher and the like may be used. When the thickness of the body is excessively thick, the use of the laser drill may cause the damages around the vias to lower connectivity between electrodes, and the use of the mechanical pin puncher may concentrate a stress at a time to form the vias to thereby cause the delamination, the cracks or the like as can be appreciated from FIG. 3.

However, according to the exemplary embodiment in the present disclosure, a method of separately forming vias for each of the unit laminates 110A, 110B, 110C, and 110D and stacking the vias is used to prevent delamination, cracks and the like from occurring while securing the high capacity. According to the method, it is possible to effectively increase the capacity of the capacitor component 100 and easily adjust the capacity or the thickness by the efficient process. In this case, as shown in FIG. 2, an example in which four unit laminates 110A, 110B, 110C, and 110D are used is described in this exemplary embodiment, but a multilayer structure may be obtained by using three unit laminates and a larger number of unit laminates may be used to achieve higher capacity.

At this time, the thickness of the unit laminates 110A, 110B, 110C, and 110D may be 90 to 130 μm.

If the thickness of the unit laminates 110A, 110B, 110C, and 110D is less than 90 μm, a large amount of unit laminates are required to secure the high capacity, which is inefficient. If the thickness of the unit laminates 110A, 110B, 110C, and 110D exceeds 130 μm, the damages around the vias, the delamination, the cracks or the like may occur during the formation of the vias.

To secure an adhesive of the connecting electrode to the unit laminate and reduce misalignment, a diameter Da, Db, Dc, or Dd of the connecting electrode of at least one of the plurality of unit laminates 110A, 110B, 110C, and 110D is different from those of the connecting electrodes of other unit laminates. A cross sectional shape of the connecting electrode is not particularly limited, and the cross section of the connecting electrode may have shapes such as a circle, a rectangle, and a triangle. However, in order to more fully describe the present disclosure, the case where the cross sectional shape of the connecting electrode is circular will be described.

As shown in FIG. 2, in the capacitor component 100 according to the exemplary embodiment in the present disclosure, the diameters Da, Db, Dc, and Dd of the connecting electrodes of the plurality of unit laminates 110A, 110B, 110C, and 110D may be different from each other. In addition, the unit laminates 110A, 110B, 110C, and 110D may be stacked in order of diameters of the connecting electrodes from the largest to the smallest. That is, the unit laminate 110A may be disposed at the lowermost part, the unit laminate 110B may be disposed on the unit laminate 110A, the unit laminate 110C may be disposed on the unit laminate 110B, and the unit laminate 110D may be disposed on the unit laminate 110C.

As shown in FIG. 4, when center axes of the connecting electrodes are coincident with each other, even if the diameters Da, Db, Dc, and Dd of the connecting electrodes are all the same or different, the connectivity between the connecting electrodes may be excellent. However, if the plurality of unit laminates are stacked, the central axes of the connecting electrodes may not coincide with each other, and if the diameters Da, Db, Dc, and Dd of the connecting electrodes are all the same, the misalignment may occur to lower the connectivity between the connecting electrodes. However, as shown in FIG. 5, when the diameters Da, Db, Dc, and Dd of the connecting electrodes are different, an misalignment of the central axis of the diameters Da, Db, Dc, and Dd of the connecting electrodes is unlikely to lower the connectivity between the connecting electrodes, as long as adjacent two of the connecting electrodes having the respective two of the diameters of Da, Db, Dc, and Dd overlap with each other.

However, in the capacitor component 100 according to the exemplary embodiment in the present disclosure, since the diameters Da, Db, Dc, and Db of the connecting electrodes of the plurality of unit laminates 110A, 110B, 110C, and 110D are different from each other, the misalignment may be reduced and the electrical connectivity and the reliability may be improved even when the central axes between the connecting electrodes do not coincide with each other as shown in FIG. 4.

At this time, the diameter of the connecting electrode of the unit laminate may be 50 to 300 μm.

If the diameter of the connecting electrode of the unit laminate is less than 50 μm, it may be difficult to secure the electrical connectivity, and if the diameter exceeds 300 μm, it may be difficult to secure the capacity.

For example, when the multilayer structure is formed using four unit laminates as shown in FIG. 2, the diameter of the connecting electrode of the unit laminate 110A disposed at the lowermost part may be 250 to 300 μm, the diameter of the connecting electrode of the unit laminate 110B disposed on the unit laminate 110A may be 200 to 250 μm, the diameter of the connecting electrode of the unit laminate 110C disposed on the unit laminate 110B may be 150 to 200 μm, and the diameter of the connecting electrode of the unit laminate 110D disposed on the unit laminate 110C may be 100 to 150 μm.

The unit laminates 110A, 110B, 110C and 110D may include the body, the plurality of internal electrodes 121 and 122 disposed inside the body, and connecting electrodes 131A, 132A, 131B, 132B, 131C, 132C, 131D, and 132D extending in a thickness direction of the body to be connected to the plurality of internal electrodes 121 and 122. In the present exemplary embodiment, the plurality of internal electrodes 121 and 122 are called a first internal electrode 121 and a second internal electrode 122, and in the connecting electrodes 131A, 132A, 131B, 132B, 131C, 132C, 131D and 132D, the connecting electrodes connected to the first internal electrode 121 is called first connecting electrodes 131A, 131B, 131C and 131D and the connecting electrodes connected to the second internal electrode 122 is called second connecting electrodes 132A, 132B, 132C and 132D.

The body may be formed by stacking the plurality of dielectric layers 111, and the dielectric layers may be formed of ceramics or the like known in the art. For example, the body may be formed by sintering a green sheet containing a barium titanate ($BaTiO_3$)-based ceramic material or the like. In this case, $BaTiO_3$-based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$ or the like in which calcium (Ca), zirconium (Zr) and the like are partially solidified in the $BaTiO_3$, and the $BaTiO_3$-based ceramic powder is not be limited thereto. In addition to the barium titanate-based ceramic material, other materials having a high dielectric constant may be used. For example, the body may be formed of a strontium titanate ($SrTiO_3$)-based material. In addition, a ceramic additive, an organic solvent, a plasticizer, a binder, a dispersant and the like may be added to the body together with the ceramic powder, if necessary. On the other hand, the dielectric layers obtained by sintering the green sheet may be integrated without an interlayer distinction to the extent that they may not be confirmed without using a scanning electron microscope (SEM).

The first and second internal electrodes 121 and 122 included in each of the unit laminates 110A, 110B, 110C, and 110D have different polarities and are alternately disposed having the dielectric layer interposed therebetween. In this case, the first and second internal electrodes 121 and 122 may be formed by printing a conductive paste on the ceramic green sheet. Examples of the material forming the first and second internal electrodes 121 and 122 may include nickel (Ni), copper (Cu), palladium (Pd), and alloys thereof. In addition, as a method of printing a conductive paste, a screen printing method or a gravure printing method may be used, but the printing method is not limited thereto.

The first and second connecting electrodes 131A, 132A, 131B, 132B, 131C, 132C, 131D and 132D may extend in the thickness direction (Z-axis direction in FIG. 2) of the body, and may be connected to the first and second internal electrodes 121 and 122, respectively and formed by penetrating through the body as shown in FIG. 2.

At this time, the first and second internal electrodes 121 and 122 may each include first and second insulating portions 121a and 122a. The first and second insulating portions 121a and 122a may mean regions in which the first and second internal electrodes 121 and 122 are not formed and serve to connect the first and second internal electrodes 121 and 122 only to external electrodes having different polarities. That is, the first connecting electrodes 131A, 131B, 131C, and 131D are spaced apart from the second internal electrode 122 by the second insulating portion 122a, and the second connecting electrodes 132A, 132B, 132C, and 132D are spaced apart from the first internal electrode 121 by the first insulating portion 121a.

The first and second internal electrodes 121 and 122 are connected to the first and second external electrodes 141 and 142, respectively, by the first and second connecting electrodes 131A, 132A, 131B, 132B, 131C, 132C, 131D, and 132D, such that an area where the first and second internal electrodes 121 and 122 overlap each other having the dielectric layer 111 interposed therebetween may be maximized, thereby remarkably increasing the capacity of the capacitor of the capacitor component 100.

Meanwhile, the first and second connecting electrodes 131A, 132A, 131B, 132B, 131C, 132C, 131D, and 132D may be formed by forming vias in the body and the internal electrodes 121 and 122 and filling the vias with a conductive material. For the filling of the conductive material, a method of filling of a conductive paste, plating or the like may be used.

In this case, vias H1 and H2 (shown in FIGS. 8 and 9) of the unit laminates 110A, 110B, 110C, and 110D may be obtained by perforating the ceramic green sheet using the laser drill, the mechanical pin puncher or the like.

The first and second external electrodes 141 and 142 may be provided as regions where the capacitor component 100 is mounted on a board or the like, and may have a multilayer structure, if necessary. As in the present exemplary embodiment, the first and second external electrodes 141 and 142 may be formed only on the lower part of the capacitor component 100, and may not be formed on the upper surface or the side surface thereof. That is, the first and second external electrodes 141 and 142 may be connected to the first and second connecting electrodes 131A, 132A, 131B, 132B, 131C, 132C, 131D and 132D, respectively, and may be formed on the lower surface of the unit laminate 110A disposed at the lowermost part among the plurality of unit laminates.

Figure 6:
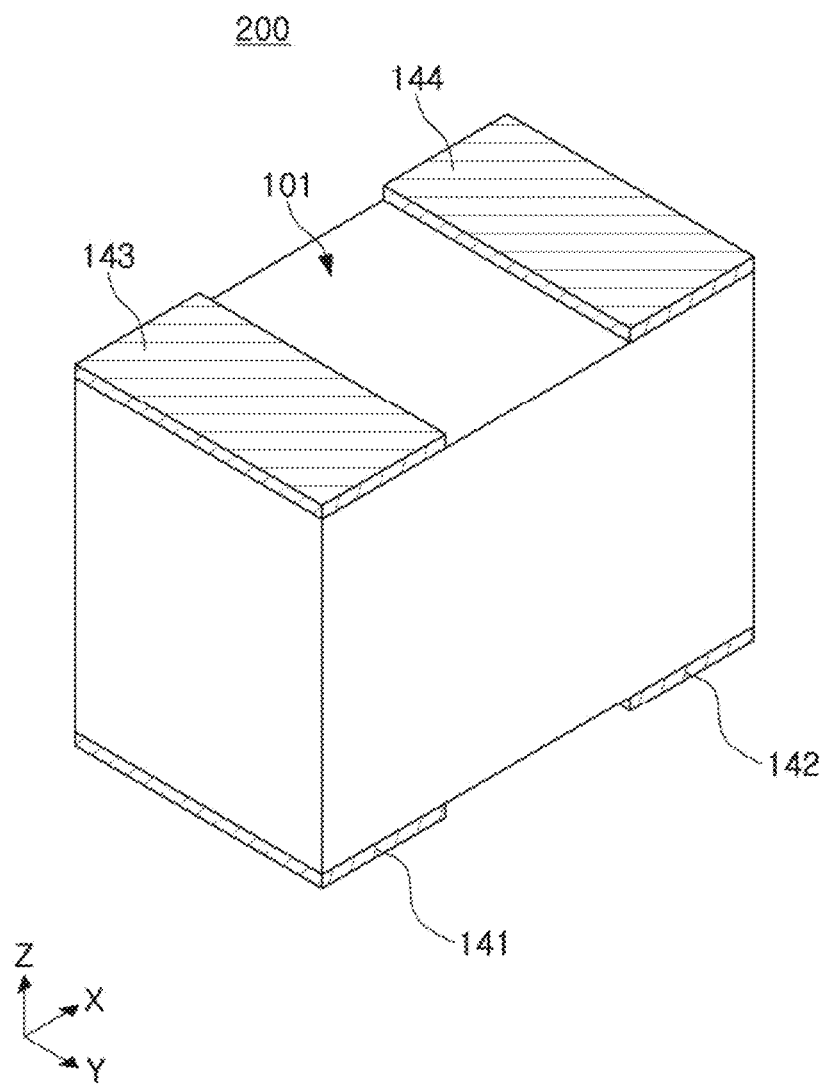
FIG. 6 is a cross-sectional view schematically showing a capacitor component according to another exemplary embodiment in the present disclosure.

However, like a capacitor component 200 according to a modification of FIG. 6, the capacitor component 200 may include the external electrodes 143 and 144 formed on an upper part. Here, the upper part may be understood as an upper surface of the unit laminate 110D disposed at the uppermost part among the plurality of unit laminates.

Figure 7:
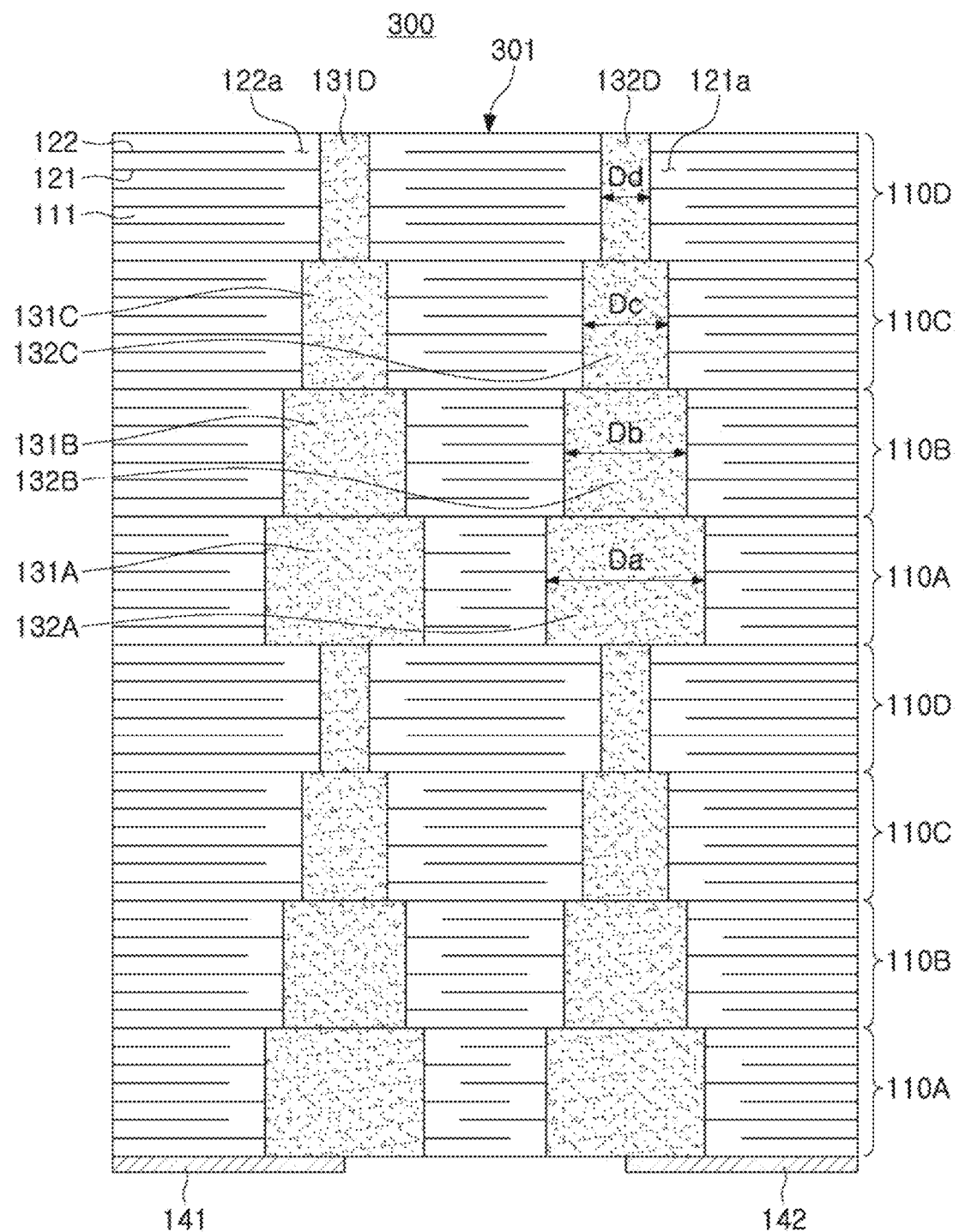
FIG. 7 is a perspective view showing a modification of a form of external electrodes in the exemplary embodiment of FIG. 1.

FIG. 7 is a cross-sectional view schematically showing a capacitor component according to another exemplary embodiment in the present disclosure.

Referring to FIG. 7, a capacitor component 300 may have a structure in which a plurality of unit laminates are stacked like the exemplary embodiment described above, and may have a structure 301 in which unit laminates having the same diameter are stacked so as not to be adjacent to each other.

When the number of unit laminates 110A, 110B, 110C, and 110D having the same size of the connecting electrodes is present two by two and a total of eight unit laminates are stacked, the unit laminates 110A, 110B, 110C, and 110D having different diameters Da, Db, Dc, and Dd of connecting electrodes are stacked in order of diameters of the connecting electrodes from the largest to the smallest so that the unit laminates having the same diameter are not adjacent to each other and then the stacking may be made again from the unit laminate 110A in order of diameters of the connecting electrodes from the largest to the smallest, such that the multilayer structure 301 may be prepared.

That is, as shown in FIG. 7, the unit laminate 110A may be disposed at the lowermost part, the unit laminate 110B may be disposed on the unit laminate 110A, the unit laminate 110C may be disposed on the unit laminate 110B, and the unit laminate 110D may be disposed on the unit laminate 110C, and then the stacking may be made again from the unit laminate 110A in order of diameters of the connecting electrodes from the largest to the smallest.

Figure 8:
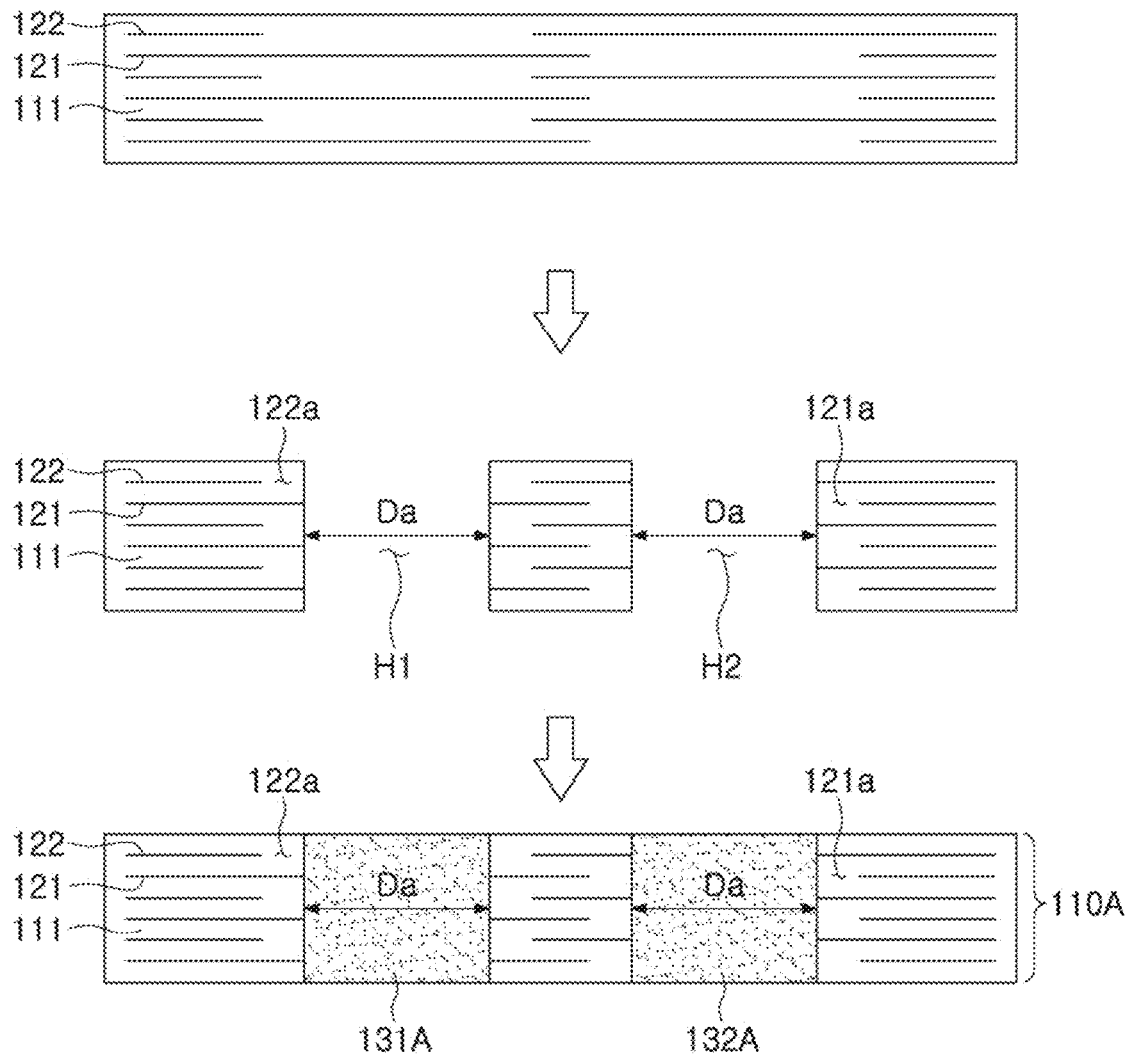
FIG. 8 is a diagram showing an example of manufacturing a unit laminate.
Figure 9:
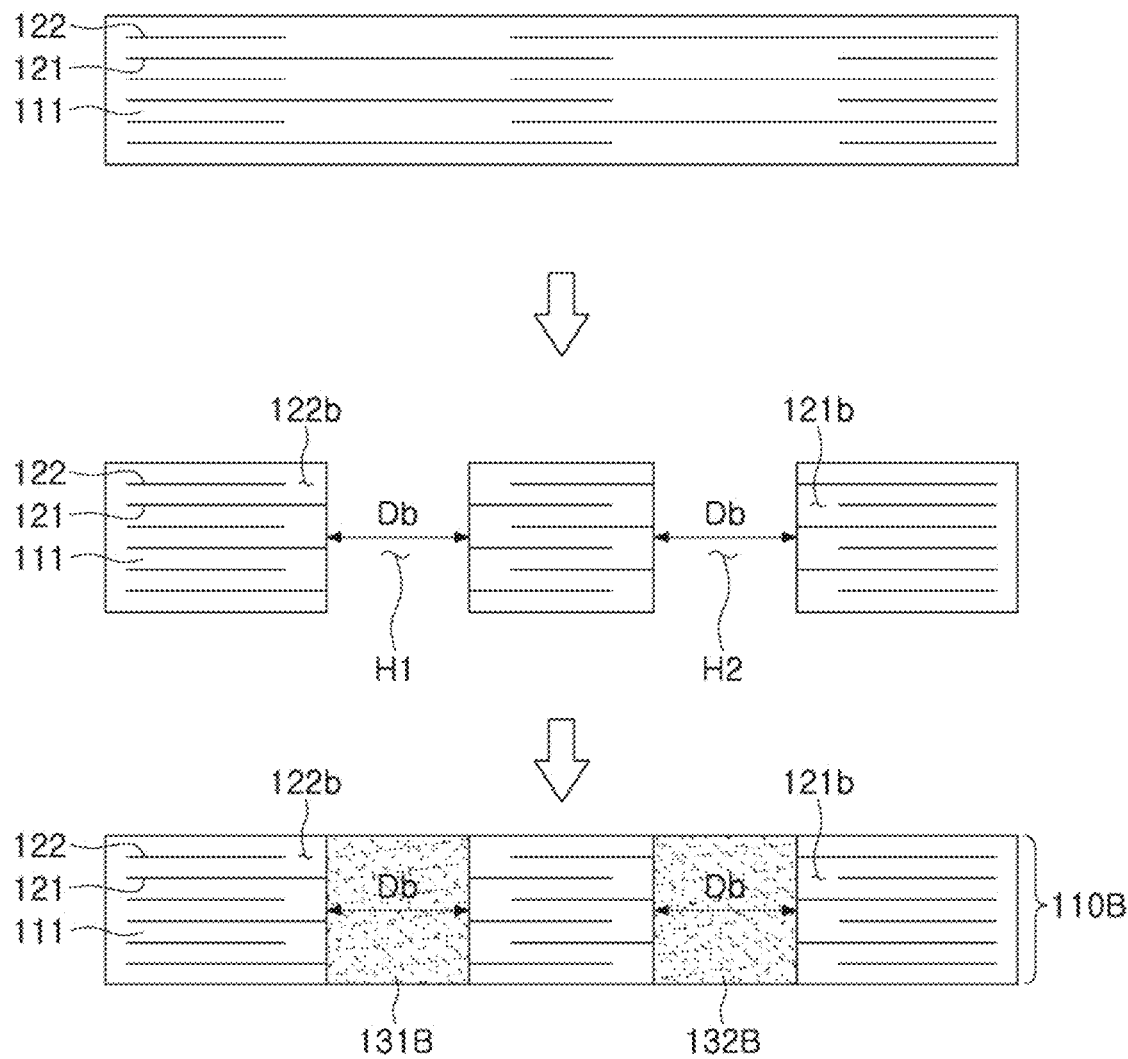
FIG. 9 is a diagram showing an example of manufacturing another unit laminate.
Figure 10:
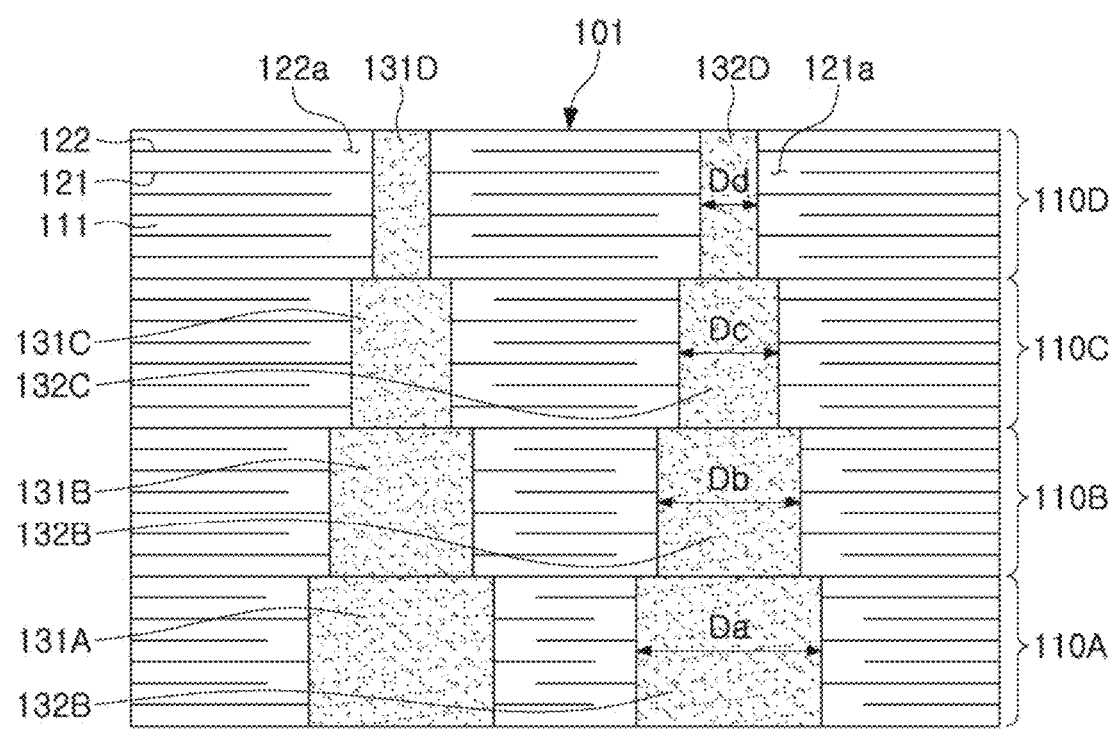
FIG. 10 is a cross-sectional view schematically illustrating that the unit laminates are stacked.

FIGS. 8 through 10 show an example of manufacturing a capacitor component, and the structure of the capacitor component described above may become clearer from the description of this manufacturing method.

First of all, referring to FIG. 8, a body is prepared by stacking sheets obtained by printing a paste containing conductive metal on one surface of a ceramic green sheet of a dielectric layer to a predetermined thickness. Next, the unit laminate 110A may be obtained by forming the vias H1 and H2 matching the diameter Da of the connecting electrode by a physical penetration method and forming the first and second connecting electrodes 131A and 132A by filling the vias H1 and H2 with the conductive material.

Referring to FIG. 9, the body is prepared by stacking sheets obtained by printing a paste containing conductive metal on one surface of a ceramic green sheet of a dielectric layer to a predetermined thickness. Next, the unit laminate 110B may be obtained by forming the vias H1 and H2 matching the diameter Db of the connecting electrode by a physical penetration method and forming the first and second connecting electrodes 131B and 132B by filling the vias H1 and H2 with the conductive material.

Like the method of obtaining unit laminates 110A and 110B described above, the unit laminate 110C and the unit laminate 110D may each be obtained by forming the vias H1 and H2 matching the diameters Dc and Dd of the respective connecting electrodes and forming the first and second connecting electrodes 131C, 132C, 131D, and 132D by filling the vias H1 and H2 with the conductive material.

Thereafter, as shown in FIG. 10, the multilayer structure may be obtained by stacking the unit laminates 110A, 110B, 110C, and 110D in order of diameters of the connecting electrodes from the largest to the smallest. As described above, the number of unit laminates 110A, 110B, 110C, and 110D may be adjusted in consideration of required capacity, thickness conditions, and the like.

After the multilayer structure is obtained, the process of forming external electrodes on the lower surface of the unit laminate 110A disposed at the lowermost part may be performed.

As set forth above, according to exemplary embodiments of the present disclosure, the capacitor component may be implemented in the high capacity and may obtain the excellent electrical connectivity and reliability by reducing the misalignment between the connecting electrodes even when a thickness is increased.

While exemplary embodiments have been shown and described above, it will be apparent to those skilled in the art that modifications and variations could be made without departing from the scope of the present invention as defined by the appended claims.

What is claimed is:

1. A capacitor component, comprising:
  a multilayer structure including unit laminates, each unit laminate having a plurality of dielectric layers and a plurality of internal electrodes alternately disposed with each other, and each unit laminate having a first connecting electrode extending in a stacking direction of the plurality of internal electrodes, the first connecting electrode connected to portions of the plurality of internal electrodes and extending through the plurality of dielectric layers and the plurality of internal electrodes,
  wherein first connecting electrodes of unit laminates adjacent to each other among the unit laminates are connected to each other, and
  a diameter of a first connecting electrode of at least one of the unit laminates is different from diameters of first connecting electrodes of other unit laminates.

2. The capacitor component of claim 1, wherein the first connecting electrodes of the unit laminates have different diameters.

3. The capacitor component of claim 2, wherein the unit laminates are stacked in order of the diameters of the first connecting electrodes from the largest to the smallest.

4. The capacitor component of claim 1, wherein a thickness of each unit laminate is 90 to 130 µm.

5. The capacitor component of claim 1, wherein the diameter of the first connecting electrode of each unit laminate is 50 to 300 µm.

6. The capacitor component of claim 1, wherein in each laminate unit, the plurality of internal electrodes include first and second internal electrodes alternately disposed.

7. The capacitor component of claim 6, wherein in each unit laminate, the first connecting electrode is connected to the first internal electrodes, and
  each unit laminate further includes a second connection electrode extending in the stacking direction of the plurality of internal electrodes and connected to the second internal electrodes.

8. The capacitor component of claim 7, wherein in each unit laminate, the first connecting electrode is spaced apart from the second internal electrodes, and the second connecting electrode is spaced apart from the first internal electrodes.

9. The capacitor component of claim 7, further comprising:
  first and second external electrodes connected to the first and second connecting electrodes, respectively, and disposed on a lower surface of a unit laminate disposed at a lowermost part among the unit laminates.

10. The capacitor component of claim 9, further comprising third and fourth external electrodes disposed on an upper surface of a unit laminate disposed at an uppermost part among the unit laminates.

11. The capacitor component of claim 1, wherein the unit laminates having the same diameter are spaced apart from each other.

12. The capacitor component of claim 1, wherein a number of the unit laminates is three or greater.

13. A capacitor component, comprising:
  a multilayer structure including unit laminates, each unit laminate having a plurality of internal electrodes and a first connecting electrode extending in a stacking direction of the plurality of internal electrodes and connected to portions of the plurality of internal electrodes,
  wherein first connecting electrodes, of unit laminates adjacent to each other among the unit laminates, extend from each other, and
  a diameter of a first connecting electrode of at least one of the unit laminates is different from diameters of first connecting electrodes of other unit laminates.

14. The capacitor component of claim 13, wherein the first connecting electrodes of the unit laminates have different diameters.

15. The capacitor component of claim 14, wherein the unit laminates are stacked in order of the diameters of the first connecting electrodes from the largest to the smallest.

16. The capacitor component of claim 13, wherein in each laminate unit, the plurality of internal electrodes include first and second internal electrodes alternately disposed.

17. The capacitor component of claim 16, wherein in each unit laminate, the first connecting electrode is connected to the first internal electrodes and spaced apart from the second internal electrodes, and
  each unit laminate further includes a second connection electrode extending in the stacking direction of the plurality of internal electrodes, connected to the second internal electrodes, and spaced apart from the first internal electrodes.

18. The capacitor component of claim 17, further comprising:
  first and second external electrodes connected to the first and second connecting electrodes, respectively, and disposed on a lower surface of a unit laminate disposed at a lowermost part among the unit laminates.

19. The capacitor component of claim 13, wherein the unit laminates having the same diameter are spaced apart from each other.

20. A capacitor component, comprising:
  a multilayer structure including unit laminates, each unit laminate having a plurality of internal electrodes and a first connecting electrode extending in a stacking direction of the plurality of internal electrodes and connected to portions of the plurality of internal electrodes,
  wherein first connecting electrodes, of unit laminates adjacent to each other among the unit laminates, are in direct contact with each other, and
  a diameter of a first connecting electrode of at least one of the unit laminates is different from diameters of first connecting electrodes of other unit laminates.

* * * * *